(12) United States Patent
Inoue et al.

(10) Patent No.: US 7,307,551 B2
(45) Date of Patent: Dec. 11, 2007

(54) DELIMITER LOOKUP USING PROCESSOR PERMUTATION INSTRUCTION

(75) Inventors: Hiroshi Inoue, Kanagawa-ken (JP); Takao Moriyama, Kanagawa-ken (JP); Motohiro Kawahito, Kanagawa-ken (JP); Hideaki Komatsu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/215,694

(22) Filed: Aug. 30, 2005

(65) Prior Publication Data

US 2007/0046505 A1 Mar. 1, 2007

(51) Int. Cl.
*H03M 7/00* (2006.01)
(52) U.S. Cl. .......................................... 341/51; 341/50
(58) Field of Classification Search ............. 341/50–90
See application file for complete search history.

(56) References Cited

U.S. PATENT DOCUMENTS 5,889,746 A * 3/1999 Moriyama et al. ....... 369/30.03
6,067,282 A * 5/2000 Moriyama et al. ....... 369/53.41

OTHER PUBLICATIONS

Zhijie Shi et al., Subword Sorting with Versatile Permutation Instructions, Procs. of ICCD 2002 Int'l Conf. on Computer Design, pp. 234-241 (Sep. 2002).
vec_perm description, AltiVec Technology Programming Interface Manual, p. 4-84, copyright 1999.
Ben Gibbs et al., vperm description, IBM eserver BladeCenter JS20 PowerPC 970 Programming Environment Redpaper, pp. 48-49, Jan. 2005.

* cited by examiner

*Primary Examiner*—Lam T. Mai
(74) *Attorney, Agent, or Firm*—Vazken Alexanian

(57) ABSTRACT

Delimiter lookup is accomplished using a processor permutation instruction. A 256-bit bitmap is defined and stored within two sixteen-byte registers. Each bit of the bitmap represents an eight-bit character occurrable within a character string, such as a section of eXtensible Markup Language (XML) code, and has a value indicating whether the character is a target character, such as a delimiter. The character string has a number of eight-bit characters at a corresponding number of positions. The first position within the character string at which one of the target characters occurs is determined, using the 256-bit bitmap and a processor permutation instruction. The first position within the character string at which one of the target characters occurs, as has been determined, is output.

20 Claims, 8 Drawing Sheets

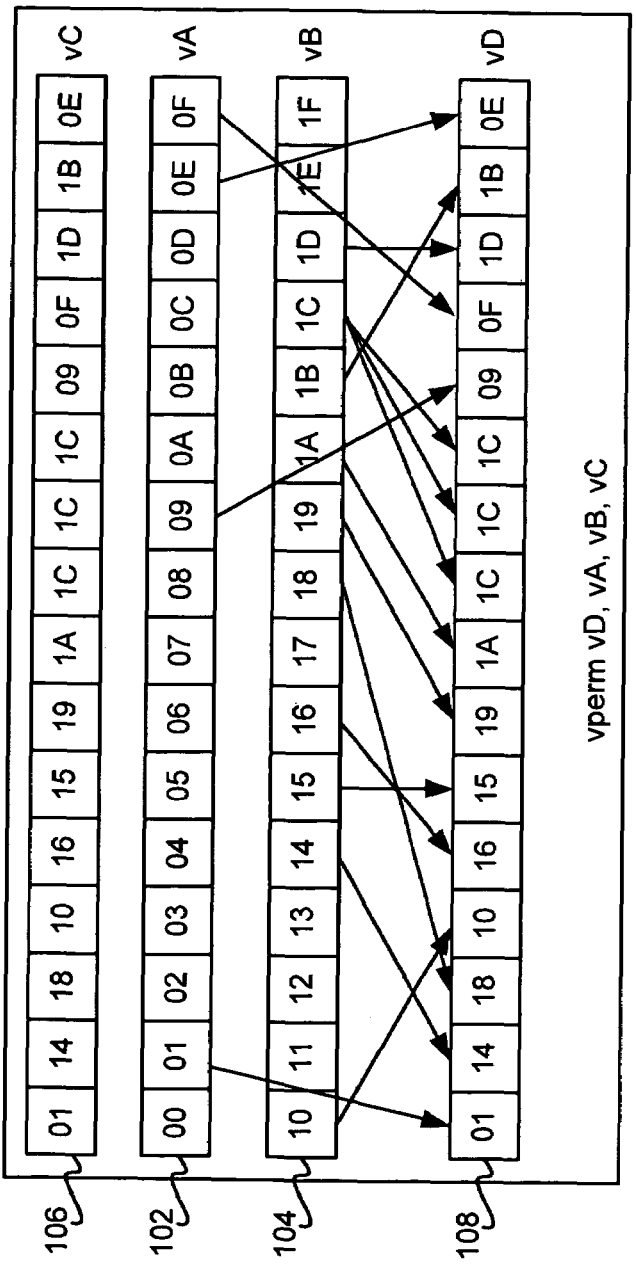

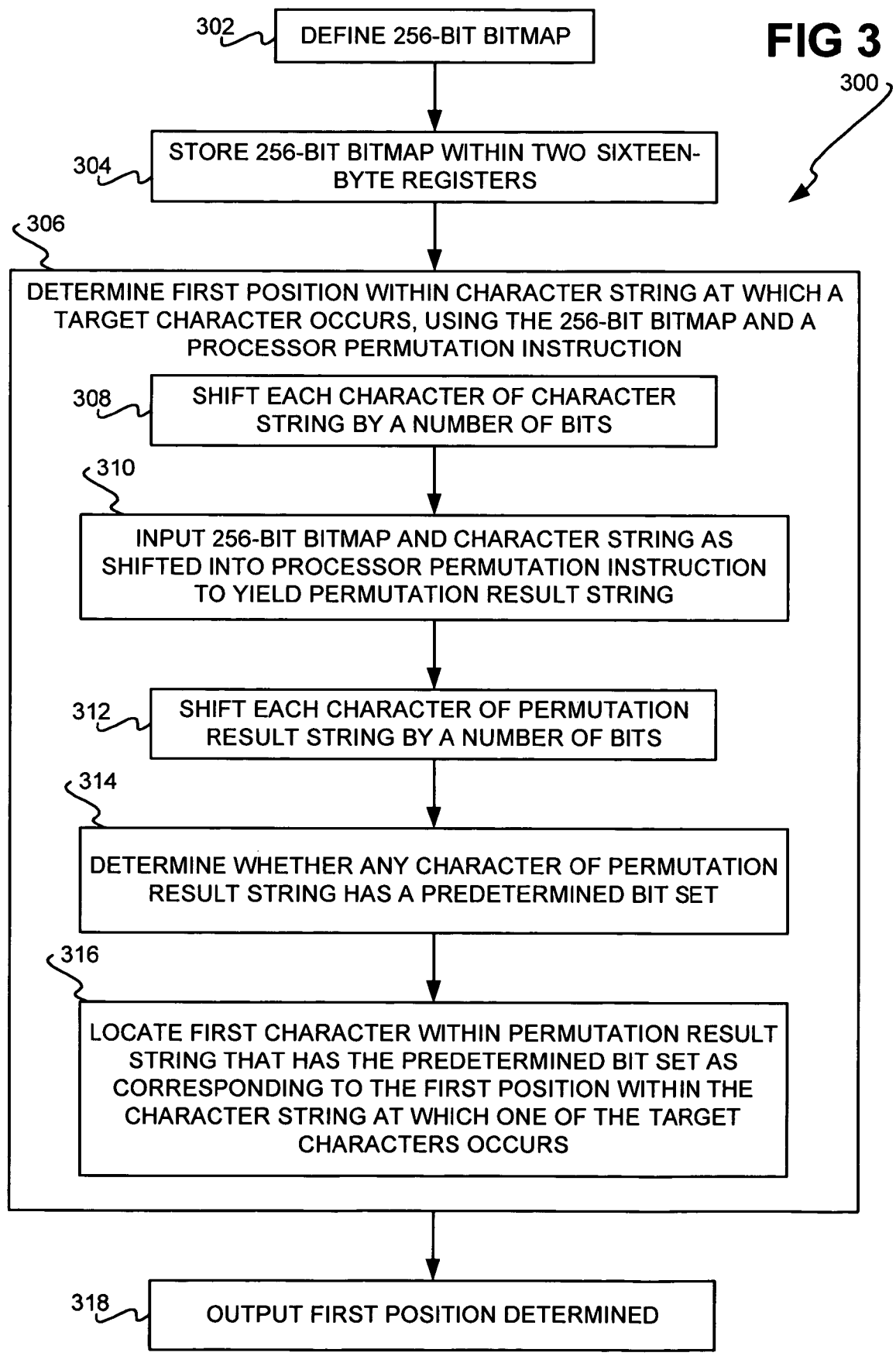

FIG 4

| | |
|---|---|
| 1 | vec_uchar16 vchars; |
| 2 | const vec_uchar16 vec_0x03={3,3,3,3,3,3,3,3,3,3,3,3,3,3,3,3}; |
| 3 | const vec_uchar16 vec_0x80={0x80, 0x80, 0x80, ........, 0x80}; |
| 4 | vbytes = vec_perm(map0, map1, vec_sr(vchars, vec_0x03)); |
| 5 | vbits = vec_sl(vbytes, vchars); |
| 6 | if (vec_any_ge(vbits, vec_0x80)) { |
| 7 | // found delimiter in vchars |
| 8 | } |

FIG 5

```
ORIGINAL ARRAY
char table[256] = {
   5, 0, 0, 0, 0, 0, 0, 0, 0, 1, 1, 0, 0, 1, 0, 0, /* 0x00 */
   0, 0, 0, 0, 0, 0, 0, 0, 0, 0, 0, 0, 0, 0, 0, 0, /* 0x10 */
   1, 1, 1, 1, 1, 1, 1, 3, 1, 1, 1, 1, 1, 1, 1, 1, /* 0x20 */
   1, 1, 1, 1, 1, 1, 1, 1, 1, 1, 1, 2, 1, 1, 1, 1, /* 0x30 */
   1, 1, 1, 1, 1, 1, 1, 1, 1, 1, 1, 1, 1, 1, 1, 1, /* 0x40 */
   1, 1, 1, 1, 1, 1, 1, 1, 1, 1, 1, 1, 4, 1, 1, 1, /* 0x50 */
   1, 1, 1, 1, 1, 1, 1, 1, 1, 1, 1, 1, 1, 1, 1, 1, /* 0x60 */
   1, 1, 1, 1, 1, 1, 1, 1, 1, 1, 1, 1, 1, 1, 1, 1, /* 0x70 */
   0, 0, 0, 0, 0, 0, 0, 0, 0, 0, 0, 0, 0, 0, 0, 0, /* 0x80 */
   0, 0, 0, 0, 0, 0, 0, 0, 0, 0, 0, 0, 0, 0, 0, 0, /* 0x90 */
   0, 0, 0, 0, 0, 0, 0, 0, 0, 0, 0, 0, 0, 0, 0, 0, /* 0xa0 */
   0, 0, 0, 0, 0, 0, 0, 0, 0, 0, 0, 0, 0, 0, 0, 0, /* 0xb0 */
   0, 0, 0, 0, 0, 0, 0, 0, 0, 0, 0, 0, 0, 0, 0, 0, /* 0xc0 */
   0, 0, 0, 0, 0, 0, 0, 0, 0, 0, 0, 0, 0, 0, 0, 0, /* 0xd0 */
   0, 0, 0, 0, 0, 0, 0, 0, 0, 0, 0, 0, 0, 0, 0, 0, /* 0xe0 */
   0, 0, 0, 0, 0, 0, 0, 0, 0, 0, 0, 0, 0, 0, 0, 0};/* 0xf0 */

CONVERTED BITMAP
vec_uchar16 map0 = {
   0xff, 0x9b, 0xff, 0xff, 0x02, 0x00, 0x00, 0x08, /* 0x00-0x3f */
   0x00, 0x00, 0x00, 0x04, 0x00, 0x00, 0x00, 0x00};/* 0x40-0x7f */
vec_uchar16 map1 = {
   0xff, 0xff, 0xff, 0xff, 0xff, 0xff, 0xff, 0xff, /* 0x80-0xbf */
   0xff, 0xff, 0xff, 0xff, 0xff, 0xff, 0xff, 0xff};/* 0xc0-0xff */
```

FIG 7

```
1   const vec_uchar16 vec_pack_hi={0x00,0x02,0x04,...,0x1C,0x1E};

2   const vec_uchar16 vec_pack_lo={0x01,0x03,0x05,...,0x1D,0x1F};

3   vchars_hi = vec_perm(vchars1, vchars2, vec_pack_hi);

4   vchars_lo = vec_perm(vchars1, vchars2, vec_pack_lo);

5   vbytes_hi = vec_perm(map_hi0, map_hi1,
                        vec_sr(vchars_hi, vec_0x03));

6   vbytes_lo = vec_perm(map_lo0, map_lo1,
                        vec_sr(vchars_lo, vec_0x03));

7   vbits_hi = vec_sl(vbytes_hi, vchars_hi);

8   vbits_lo = vec_sl(vbytes_lo, vchars_lo);

9   vbits = vec_and(vbits_hi, vbits_lo);

10  if (vec_any_ge(vbits, vec_0x80)) {

11      if (table[data[result]]!=1)

12          // found delimiter in vchars 13      else

14          // false hit. check next character

```
vec_uchar16 map_lo0 = {
    0xff, 0x9b, 0xff, 0xff, 0x02, 0x80, 0x00, 0x08, /* 0x00-0x3f */
    0x00, 0x00, 0x00, 0x04, 0x00, 0x00, 0x00, 0x00};/* 0x40-0x7f */
vec_uchar16 map_lo1 = {
    0xff, 0xff, 0xff, 0xff, 0xff, 0xff, 0xff, 0xff, /* 0x80-0xbf */
    0xff, 0xff, 0xff, 0xff, 0xff, 0xff, 0xff, 0xff};/* 0xc0-0xff */ vec_uchar16 map_hi0 = {
    0x80, 0x00, 0x00, 0x00, 0x80, 0x00, 0x00, 0x00, /* 0x00-0x3f */
    0x00, 0x00, 0x00, 0x00, 0x00, 0x00, 0x00, 0x00};/* 0x40-0x7f */
vec_uchar16 map_hi1 = {
    0x00, 0x00, 0x00, 0x00, 0x00, 0x00, 0x00, 0x00, /* 0x80-0xbf */
    0x00, 0x00, 0x00, 0x00, 0x00, 0x00, 0x00, 0x00};/* 0xc0-0xff */
```

```
In(n) = ( U      edge (n, m, In(m)) ) U GEN(n)
         m ∈ Pred(n)
edge (n, m, In)
{
    if (m's last instruction is if-statement) {
        category = category of if-statement;//any of 1, 2 and 3
        if (category == 1) {
            taken = set of extractable values of lookup target array at time when
conditions meet
            no_taken = ~taken;
            return ((edge from m to n is at time when conditions of if-statement meet) ?
taken : no_taken ∩ In;
        } else if (category == 2) {
            taken = set of extractable values of lookup target array at time when
conditions meet as result of performing "some processing"
            no_taken = ~taken;
            return ((edge from m to n is at time when conditions of if-statement meet) ?
taken : no_taken) ∩ In:
        } else {
            return (edge from m to n is edge of outside of loop) ? Φ: In;
        }
    } else {
        return In;
    }
}
GEN(n): set of extractable values of the array if there is assignment from lookup
target array to variable for checking by use of if-statement. Otherwise, the empty
set Φ.
```

DELIMITER LOOKUP USING PROCESSOR PERMUTATION INSTRUCTION

FIELD OF THE INVENTION

The present invention relates generally to looking up delimiters within character strings, such as looking up extensible Markup Language (XML) delimiters within XML code, and more particularly to looking up such delimiters within character strings by using a processor permutation instruction, such as a single instruction stream multiple data stream (SIMD) processor permutation instruction.

BACKGROUND OF THE INVENTION

In recent years, the eXtensible Markup Language (XML) has become widely used for various purposes, including providing web services within commercial and other environments. XML is an open standard for describing data, and is published and maintained by the World Wide Web Consortium (W3C), which has an Internet presence at http://www.w3.org. XML is used to define data elements on web pages as well as documents, and employs a tag structure similar to the HyperText Markup Language (HTML). However, whereas HTML defines how elements are displayed, XML defines what those elements contain. XML allows tags to be defined by developers, and provides a common manner by which data can be identified.

XML achieves such commonality in part by using human-readable plain text as the data format in which XML files are defined and formulated. However, plain text processing can be slower than processing other types of files. For instance, each character of an XML file may be represented by eight or sixteen bits, such that all of the bits of the character must usually be examined to determine whether the character is a desired character. In general, such desired character lookup is accomplished in relation to XML files in particular to search for delimiters. A delimiter is a character or a combination of characters used to separate one item or set of data from another. For example, in comma-delimited records, a comma is used to separate each field of data. In relation to XML, characters including the greater than symbol (">"), the less than symbol ("<"), and the slash ("/"), among others, serve as delimiters.

An XML parser may have to determine the first position in which a given XML delimiter occurs within a character string that represents a section of XML code. For example, an XML parser may first have to locate a less than symbol, and then a greater than symbol, to locate the opening of a tag, and then may have to locate a less than symbol followed by a slash, and then a greater than symbol, to locate the closing of a tag. Typically, such delimiter lookup is accomplished sequentially. For a given section of XML code—that is, for a given character string—each character is examined, and it is determined whether the character is a delimiter. If not, the next character is processed, and so on, until the entire character string has been processed. Such sequential character string processing to look up delimiters is slow, however. For this and other reasons, there is a need for the present invention.

SUMMARY OF THE INVENTION

The present invention relates to delimiter lookup using a processor permutation instruction. A method of the invention defines a 256-bit bitmap, and stores the 256-bit bitmap within two sixteen-byte registers. Each bit of the bitmap represents an eight-bit character occurrable within a character string, such as a section of eXtensible Markup Language (XML) code, and has a value indicating whether the character is a target character, such as a delimiter. The character string has a number of eight-bit characters at a corresponding number of positions. The method determines the first position within the character string at which one of the target characters occurs, using the 256-bit bitmap and a processor permutation instruction. The method then outputs the first position within the character string at which one of the target characters occurs, as has been determined.

Another method of the invention defines a low 256-bit bitmap and a high 256-bit bitmap representing 256 sixteen-bit characters occurrable within a character string, such as a section of XML code, and indicating whether the characters are target characters, such as delimiters. The character string has a number of sixteen-bit characters at a corresponding number of positions. The method determines the first position within the character string at which one of the target characters occurs, using the low and the high 256-bit bitmaps and a processor permutation instruction. The method then outputs this first position within the character string at which one of the target characters occurs, as has been determined.

Another method of the invention receives a number of target characters, against which a character string having a number of characters at a corresponding number of positions is comparable to determine the first position within the character string at which one of the target characters occurs. As before, the target characters may be delimiters, and the character string may be a section of XML code. The method constructs a table indexable by a number of characters. The table has a first value for each character that is one of the target characters, and has a second value for each character that is not one of the target characters. The table has a total number of bits less than a total number of bits of all the characters. For example, if there are 256 characters, and each character has eight bits, then the total number of bits of all the characters is 256 times eight, or 2048, whereas the table may have just 256 bits.

The method then replaces first computer code effecting comparison of the character string against the target characters to determine the first position within the character string at which one of the target characters occurs with second computer code. The second computer code effects the comparison using the table constructed, as well as a processor permutation instruction. In all embodiments of the invention, the processor permutation instruction may be a single instruction stream multiple data stream (SIMD) processor permutation instruction, such as that found in the ALTIVEC, VELOCITY ENGINE, or VMX SIMD processor instruction set.

Embodiments of the invention provide for performance advantages over the prior art. By using a processor permutation instruction to assist in delimiter lookup, as opposed to sequentially looking up delimiters, delimiter lookup has been found to increase from about twenty percent to about eighty percent, using a PowerPC 970 reduced instruction set computer (RISC) processor. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of a processor permutation instruction, according to an embodiment of the invention.

FIG. 2 is a block diagram of sample inefficient delimiter lookup code, according to an embodiment of the invention.

FIG. 3 is a flowchart of a method for efficiently looking up delimiters, or target characters, within character strings made up of characters of eight bits in length, according to an embodiment of the invention.

FIG. 4 is a diagram of example efficient delimiter lookup code for eight-bit characters, according to an embodiment of the invention.

FIG. 5 is a diagram of an example 256-bit bitmap that can be used in conjunction with the method of FIG. 3 and the code of FIG. 4, where each bit of the bitmap represents an eight-bit character and has a value indicating whether the character is a target character (i.e., a delimiter), according to an embodiment of the invention.

FIG. 7 is a diagram of example efficient delimiter lookup code for sixteen-bit characters, according to an embodiment of the invention.

FIG. 8 is a diagram of an example low 256-bit bitmap and an example high 256-bit bitmap that can be used in conjunction with the method of FIG. 6 and the code of FIG. 7, according to an embodiment of the invention.

FIG. 11 is a diagram of example code to generate a conversion table for use by the computer code generated in the method of FIG. 10, according to an embodiment of the invention.

DETAILED DESCRIPTION OF THE DRAWINGS

Figure 6:
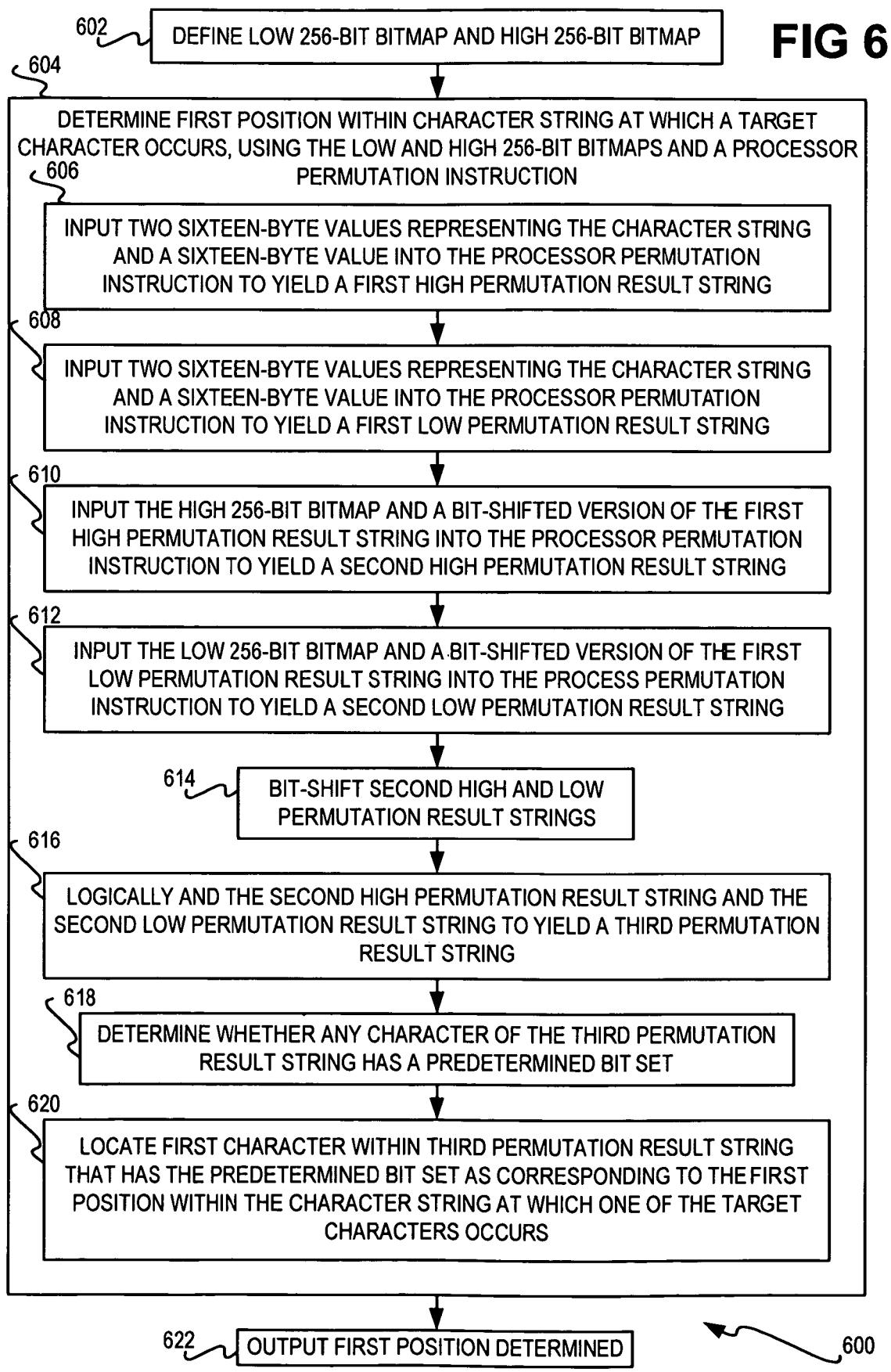
FIG. 6 is a flowchart of a method for efficiently looking up delimiters, or target characters, within character strings made up of characters of sixteen bits in length, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Processor Permutation Instruction

Embodiments of the invention employ a processor permutation, or permute, instruction, to perform target character or delimiter lookup. The processor permutation instruction may be a single instruction stream multiple data stream (SIMD) processor permutation instruction, such as that found in the ALTIVEC, VELOCITY ENGINE, or VMX SIMD processor instruction set. FIG. 1 shows an example of such a processor permutation instruction 100, according to an embodiment of the invention.

The processor permutation instruction 100 receives three sixteen-byte inputs 102, 104, and 106, corresponding to vA, vB, and vC in FIG. 1, and returns a sixteen-byte output 108, corresponding to vD in FIG. 1. The instruction 100 of FIG. 1 can be expressed as vD=vperm (vA, vB, vC), or vD=vec_perm(vA, vB, vC). In particular, the processor permutation instruction 100 allows any byte under the control of vC within two source registers vA and vB to be copied to a destination register vC. That is, each element of the result is selected independently by indexing the byte elements of vA and vB by the value of the corresponding element of vC.

Specifically, the vperm instruction takes the contents of vA and concatenates the contents of vB forming a 32 byte (0 . . . 1F) temporary value. Based on the value stored in each one of the sixteen eight-bit fields of vC, the corresponding byte of the temporary value is copied into the corresponding eight-bit field of vD. In the example of FIG. 1, the resulting value that is placed into vD has the same value as vC because the data stored in vA and vD was generated to show the 32 bytes 0 . . . 1F for clarification purposes. For example, the left-most eight bits of vC has the value of 0x01. From the temporary value of the 32 bytes, the byte 0x01 is taken and placed into the left-most eight bits (0:7) of vD. The next eight bits of vC contain the value 0x14. From the 32-byte temporary value, the value of byte 20 (0x14) is taken and placed int original the next eight bits (8:15) of vD.

The processor permutation instruction 100 may thus be considered a processor, or hardware, instruction that implements the following code:

```
do i =0 to 15
    j ← c{i}[4:7]
    if c{i}[3] == 0
        then d{i} ← a{j}
        else d{i} ← b{j}
end
```

Sample Inefficient Delimiter Lookup Code

FIG. 2 shows sample inefficient delimiter lookup code 200, according to an embodiment of the invention. The code 200 does not utilize a processor permutation instruction, and is described to provide a baseline reference against code that does utilize a processor permutation instruction and thus that is more efficient than the code 200. In the code 200, each of 256 characters is represented within the table array. The table array has a value of 1 to indicate that the corresponding character is not a delimiter, or target character, and has a value of 0 (or more, generally, a value other than 1) to indicate that the corresponding character is a delimiter. The table array is thus indexable by the characters, and returns values indicating whether the characters are delimiters or not. For example, for the character N, the value table[N] indicates whether this character is a delimiter or not.

The code 200 returns the position of a delimiter that occurs first in the character string data[ ]. The character string data[ ] may be a section of eXtensible Markup Language (XML) code, for instance. The code 200 sequentially examines each character within the character string, and if it finds a character that has the value 0x01, returns the position of that character within the character string. Such sequential processing to determine the first occurrence of a delimiter or other target character within a character string is inefficient, however.

Embodiments of the invention are thus concerned with optimizing the code 200 so that it performs efficiently, by using a processor permutation instruction like the processor permutation instruction 100 of FIG. 1. In the example code 200 of FIG. 2, each character is represented by a single eight-bit byte. Thus, one embodiment of the invention is described that is concerned with optimizing the code 200 where each character is so represented by a single eight-bit byte. However, characters may also be represented as sixteen bits, or two eight-bit bytes, such as Unicode characters, or double-byte character set (DBCS) characters. Therefore, another embodiment of the invention is described that is concerned with optimizing the code 200 where each character is represented by sixteen bits, or two eight-bit bytes. A third embodiment of the invention is then described that is concerned with converting unoptimized code, such as the code 200, to optimized code 200 that utilizes a processor permutation instruction to speed delimiter or target character lookup.

Efficient Lookup of Delimiters within Character Strings of Eight-Bit Characters

FIG. 3 shows a method 300 for efficiently looking up delimiters, or target characters, within character strings made up of characters of eight bits in length, according to an embodiment of the invention. The method 300 may be implemented by a computer program stored on a computer-readable medium, such as a recordable data storage medium, or a modulated carrier signal. FIG. 4 shows example efficient delimiter lookup code 400, according to an embodiment of the invention, for efficient lookups of delimiters within character strings of eight-bit characters, and which at least partially implements the method 300 of FIG. 3. FIG. 5 shows the conversion 500 of a 256-byte array to an example 256-bit bitmap that can be used in conjunction with the code 400 of FIG. 4 and the method 300 of FIG. 3, according to an embodiment of the invention. FIGS. 3, 4, and 5 are described together.

Referring to FIG. 3, the method 300 begins by defining a 256-bit bitmap (302). Each bit of the bitmap represents an eight-bit character that is occurrable within a character string having a number of eight-bit characters at a corresponding number of positions. The value of each bit indicates whether or not the character is a target character, or delimiter. Referring to FIG. 5, the 256-byte array table 502 indicates whether each of 256 characters is a delimiter or target character, by having a value other than one, or a non-delimiter or non-target character, by having a value of one. The table 502 is the table that can be used in conjunction with the code 200 of FIG. 2, for instance. The table 502 is converted to the 256-bit, 32-byte bitmap 504. The bitmap 504 has one bit for each character code to indicate if the character is a delimiter or not, such that the bit has a value of one if the character is a delimiter (i.e., a target character), and a value of zero if the character is not a delimiter (i.e., not a target character).

Referring back to FIG. 3, the 256-bit bitmap is stored within two sixteen-byte registers (304). This is shown in FIG. 5, in which the 256-bit bitmap is specifically stored in two sixteen-byte registers map0 and map1. Each of these registers is specifically a variable type of sixteen unsigned one-byte integer-type vector forms.

Referring back to FIG. 3, the first position within the character string at which a target character (or delimiter) occurs is then determined, using the 256-bit bitmap that has been defined, and using a processor permutation instruction (306). The performance of the part 306 of the method 300 may in one embodiment be accomplished by performing the parts 308, 310, 312, 314, and 316, and as depicted in the example code 400 of FIG. 4. The character string may be a section of extensible Markup Language (XML) code, and each target character may be an XML delimiter.

First, each character of the character string is shifted by a number of bits (308). Referring to FIG. 4, line 4 of the code 400 indicates that each character of the character string is shifted by three bits to the right—via the constant vec__0x03 defined in line 2—to yield the left most five bits of each character of the character string vchars defined in line 1. Referring back to FIG. 3, the 256-bit bitmap and the character string as shifted are input into the processor permutation instruction to yield a permutation result string (310). Referring again to FIG. 4, line 4 of the code 400 shows that the 256-bit bitmap, represented by the two sixteen-byte registers map0 and map1, as well as the three-bit-shifted-to-the-right version of the character string vchars is input into the processor permutation instruction vec_perm, which may be the instruction 100 of FIG. 1 that has been described. The permutation result string is the value vbytes.

Referring back to FIG. 3, each character of the permutation result string is shifted by a number of bits as well (312). Referring again to FIG. 4, line 5 of the code 400 indicates that each character of the permutation result string is shifted by the bits of the character string itself. The result is that one bit value can be used to show whether or not each character is a delimiter, specifically the most significant bit of each byte of the sixteen-byte permutation result string vbytes.

Referring back to FIG. 3, it is determined whether any character of the permutation result string has this predetermined bit set (314), and if so, then the first character within the permutation result string that has this predetermined bit set is located as corresponding to the first position within the character string at which one of the target characters (i.e., one of the delimiters) occurs (316). Referring again to FIG. 4, line 6 of the code 400 compares each byte of the permutation result string vbytes to the value 0x80, via the constant vec__0x80 defined in line 3, to determine whether any of the bytes of the permutation result string has the predetermined bit set, specifically the most significant bit 0x80. Line 7 of the code 400 represents the processing for finding the first character within the permutation result string that has this predetermined bit set, which may be accomplished in any of a number of different conventional ways. For instance, one bit from each byte of the permutation result string may be extracted and compared, using the count leading zero (cntlz) processor instruction.

Referring back to FIG. 3, the first position of the character string within which a target character occurs is finally output (318). For instance, output may include providing this first position to another computer program, or simply displaying it to the user on a display device, or printing it on a sheet of paper or other media. That is, embodiments of the invention are not limited by the output in the part 318 of the method 300 of FIG. 3.

The method 300 of FIG. 3 and the code 400 of FIG. 4 employs permutation operation and two shifting operation, which makes delimiter or target character lookup an efficient, high-speed process. The method 300 does create a bitmap that is utilized in the code 400, but the bitmap may be created statically beforehand, so that it does not contribute to the processing of delimiter or target character lookup. The method 300 and the code 400 have been described as assuming that the most significant five bits of each character are used to index a byte within the 32-byte (256-bit) table or bitmap, and the less significant three bits used to locate the position of the predetermined (most significant) bit within the byte. However, this was accomplished for example purposes, and other arrangements may be employed. For instance, the least significant five bits within a character may be used to locate a byte within the table, and the most significant three bits may be used to locate the predetermined bit within the bit, with a corresponding transformation of the lookup table.

Thus, the approach that has been described in this section of the detailed description converts a 256-byte length table array into a 256-bit length bitmap, which contains one bit of information for each character to indicate whether or nor the character is a delimiter. This leads to higher-speed processing of the delimiter lookup, using a processor permutation instruction. The processor permutation instruction allows for the 32-byte table (i.e., the 256-bit bitmap) to be freely rearranged in accordance with a designated pattern. Accordingly, processing speed is increased significantly.

Figure 9:
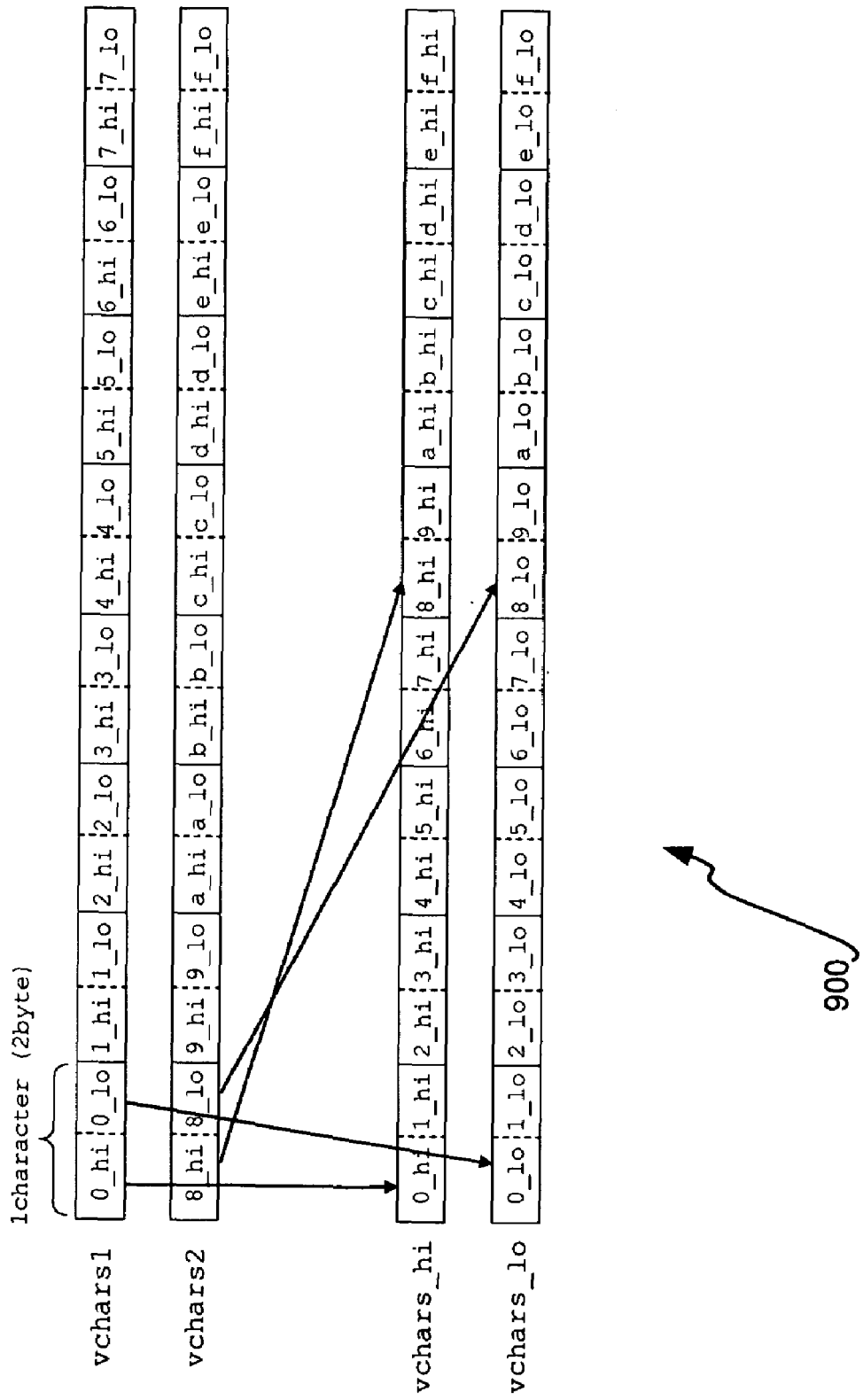
FIG. 9 is a diagram showing how a processor permutation instruction can be used in conjunction with the method of FIG. 6 and the code of FIG. 7, according to an embodiment of the invention.

Efficient Lookup of Delimiters within Character Strings of Sixteen-bit Characters FIG. 6 shows a method 600 for efficiently looking up delimiters, or target characters, within character strings made up of characters of sixteen bits in length, according to an embodiment of the invention. The method 600 may be implemented by a computer program stored on a computer-readable medium, such as a recordable data storage medium, or a modulated carrier signal. FIG. 7 shows example efficient delimiter lookup code 700, according to an embodiment of the invention, for efficient lookups of delimiters within character strings of sixteen-bit characters, and which at least partially implements the method 600 of FIG. 6. FIG. 8 shows an example low 256-bit bitmap and an example high 256-bit bitmap that can be used in conjunction with the code 700 of FIG. 7 and the method 600 of FIG. 6, according to an embodiment of the invention. FIG. 9 shows how a processor permutation instruction can be used in conjunction with the code 700 of FIG. 7 and the method 600 of FIG. 6, according to an embodiment of the invention.

FIGS. 6, 7, 8, and 9 are now described together. However, it is noted that those of ordinary skill within the art can recognize the similarity between the methods 600 of FIG. 6 and 300 of FIG. 3, and the codes 700 of FIG. 7 and 400 of FIG. 4, which are further highlighted herein. Therefore, the discussion that has been made in relation to FIGS. 3 and 4 is also applicable to at least some extent to FIGS. 6 and 7 here, and is not repeated at length to avoid redundancy.

Referring to FIG. 6, the method 600 begins by defining a low 256-bit bitmap and a high 256-bit bitmap (602). The two bitmaps represent 256 sixteen-bit characters occurrable within a character string having a number of sixteen-bit characters at a corresponding number of positions, and indicate whether the characters are target characters (i.e., delimiters). When a character code set has such characters that are sixteen bits, or two bytes, in length, such as the (Universal Transformation Format) UTF-16, or another character code set, a table showing whether a given character is a delimiter or not would ordinarily have $2^{16}$=65,536 entries. Thus, a bitmap as used in the previous embodiment of the invention, as described in the previous section of the detailed description, would have 8,192 bits, which is too long for efficient processing.

Therefore, two 256-bit bitmaps are instead employed. Referring to FIG. 8, there is a low 256-bit bitmap 802 stored over two sixteen-byte values map_lo0 and map_lo1, and a high 256-bit bitmap 804 stored over two sixteen-byte values map_hi0 and map_hi1. These bitmaps are generated from a table with 65,536 entries as follows. First, the i-th bit is set to one in the low 256-bit bitmap where there is even a single delimiter, or target character, where the lower byte of this character is i. Otherwise, the i-th bit of the. low 256-bit bitmap is set to zero. Second, the i-th bit is set to one in the high 256-bit bitmap where there is even a single delimiter, or target character, where the upper byte of this character is.i. Otherwise, the i-th bit of the high 256-bit bitmap is set to zero.

In other words, each i-th bit of the low 256-bit bitmap has a first value where any sixteen-bit target character has a lower eight bits equal to i. Otherwise, the i-th bit in question has a second value. Similarly, each i-th bit of the high 256-bit bitmap has the first value where any sixteen-bit target character has an upper eight bits equal to i. Otherwise, the i-th bit in question has the second value.

Using these two bitmaps, characters which are delimiters or target characters are thus specified in advance. Then, only characters having a possibility of being a target character are determined, and checked against the original table of 65,536 entries. If access to the table indicates that the character is in fact not a delimiter or target character, then lookup is resumed for the next character. The case where the result of accessing the two 256-bit bitmaps indicates that a given character has the possibility of being a target character, but accessing the table of 65,536 entries shows that the character is indeed not a target character, is referred to as a false hit.

Referring back to FIG. 6, the first position within the character string at which a target character (or delimiter) occurs is then determined, using the two 256-bit bitmaps that have been defined, and using a processor permutation instruction (604). The performance of the part 604 of the method 600 may in one embodiment be accomplished by performing the parts 606, 608, 610, 612, 614, 616, 618, and 620, and as depicted in the example code 700 of FIG. 7. The character string may be a section of eXtensible Markup Language (XML) code, and each target character may be an XML delimiter.

First, two sixteen-byte values representing the character string and the sixteen-byte value {0x00, 0x02, 0x04, . . . , 0x1C, 0x1E} are input into the processor permutation instruction to yield a first high permutation result string (606). Similarly, the two sixteen-byte values representing the character string and the sixteen-byte value {0x01, 0x03, 0x05, . . . , 0x1D, 0x1F} are input into the processor permutation instruction to yield a first low permutation result string (608). Referring to FIG. 7, lines 3 and 4 of the code 700 implement the parts 606 and 608 of the method 600 of FIG. 6, respectively. In these lines, the values vchars1 and vchars2 are sixteen bytes each in length, and represent sixteen two-byte (sixteen-bit) characters of the character string.

Thus, the character string is transformed into the first high permutation result string vchars_hi, via a permutation guided by the constant vec_pack_hi, which is the sixteen-byte value {0x00, 0x02, 0x04, . . . , 0x1C, 0x1E} as indicated by line 1. Similarly, the character string is transformed into the first low permutation result string vchars_lo, via a permutation guided by the constant vec_pack_lo, which is the sixteen-byte value {0x01, 0x03, 0x05, ..., 0x1D, 0x1F} as indicated by line 2. FIG. 9 illustratively shows the permutation 900 effected by lines 3 and 4 of the code 700, as implementing the parts 606 and 608 of the method 600. Thus, what is accomplished in lines 3 and 4 is that the high bytes of the two-byte (sixteen-bit) characters of the character strings are extracted to the first high permutation result string vchars_hi, and the low bytes of these characters are extracted to the first low permutation result string vchars_lo, as indicated by the permutation 900 in FIG. 9. It is further noted that the code 700 of FIG. 7 presumes that the characters of the character string are encoded in a big-endian format, but alternatively they may be encoded in a little-endian format.

Referring back to FIG. 6, the high-256 bit bitmap and a bit-shifted version of the first high permutation result string are input into the processor permutation instruction to yield a second high permutation result string (610). Similarly, the low 256-bit bitmap and a bit-shifted version of the first low permutation result string are input into the process permutation instruction to yield a second low permutation result string (612). The second high permutation result string and the second low permutation result string are then bit-shifted themselves (614).

Referring to FIG. 7 again, line 5 of the code 700 implements the part 610 of the method 600, line 6 implements the part 612, and lines 7 and 8 implement the part 614. The bit-shifted version of the first high permutation result string vchars_hi in line 5 is a shifting of each character of this result string by three bits to the right. Similarly, the bit-shifted version of the first low permutation result string vchars_lo in line 6 is a shifting of each character of this result string by three bits to the right. The constant vec_0x03 is the same constant defined in line 2 of the code 400 of FIG. 4 that has been described. Lines 5 and 6 of the code 700 may be considered as corresponding to line 4 of the code 400 in effect. The bit-shifting occurring in line 7 shifts the characters of the second high permutation result string by the bits of the first high permutation result string, to the left, and the bit-shifting occurring in line 8 shifts the characters of the second low permutation result string by the bits of the first low permutation right string, again to the left. Lines 7 and 8 of the code 700 may be considered as corresponding to line 5 of the code 400 of FIG. 4 in effect.

Referring back to FIG. 6, the second high permutation result string is logically AND'ed with the second low permutation result string to yield a third permutation result string (616), and whether any character of the third permutation result string has a predetermined bit set is determined (618). If so, and if there is not a false hit, then the first character within the third permutation result string that has the predetermined bit set is located as corresponding to the first position within the character string at which one of the target characters occurs (620). This first position determined is then output (622), as has been described in more detail in relation to the part 318 of the method 300 of FIG. 3.

Referring to FIG. 7 again, line 9 of the code 700 is the logically AND'ing of the second high and the second low permutation result strings to yield the third permutation result string vbits. The logically AND'ing process is described by the operation vec_and. Line 10 corresponds to whether any character of the third permutation result string has a predetermined bit set, specifically a most significant bit 0x80, via the constant vec_0x80 that is the same as that defined in line 3 of the code 400 of FIG. 4. Line 10 of the code 700 thus corresponds in effect to line 6 of the code 400 of FIG. 4.

However, whereas in the code 400 of FIG. 4, if the predetermined bit is set, then it can be guaranteed that the corresponding character of the character string is indeed a delimiter or target character. By comparison, in the code 700 of FIG. 7, if the predetermined bit is set, then it is not necessarily guaranteed that the corresponding character of the character string is indeed a delimiter or target character. Therefore, the verification in line 11 is accomplished, such that if a delimiter is indeed found, then appropriate process in line 12 can be performed. Otherwise, if a delimiter is not found (line 13), then a false hit has been generated.

Thus, the code 700 of FIG. 7—and therefore the method 600 of FIG. 6—does not obviate the need of a table to be accessed to determine if a given character of a character string is a delimiter (target character) or not. However, the code 700 does reduce how often such a table is accessed, and therefore increases processing speed. That is, the number of times the table is accessed to evaluate whether a character is a delimiter or not is significantly reduced, increasing processing speed.

It is noted that if a false hit occurs, extra processing is needed, which does reduce performance. Occurrence of false hits depends on the values of the delimiters and the input text, leading to a probabilistic operation. When there is a high probability of a false hit, instead of simply dividing two bytes into an upper byte and a lower byte as has been described in relation to the code 700 of FIG. 7, the two-byte value of each character may instead be rotated by a number of bits and then divided into upper and lower bytes to reduce the probability of false hits. In some cases, in other words, it is possible to reduce the probability of the occurrence of false hits, in exchange for the overhead of the bit rotation, and still increase performance.

Generating Computer Code to Utilize Processor Permutation Instruction

Figure 10:
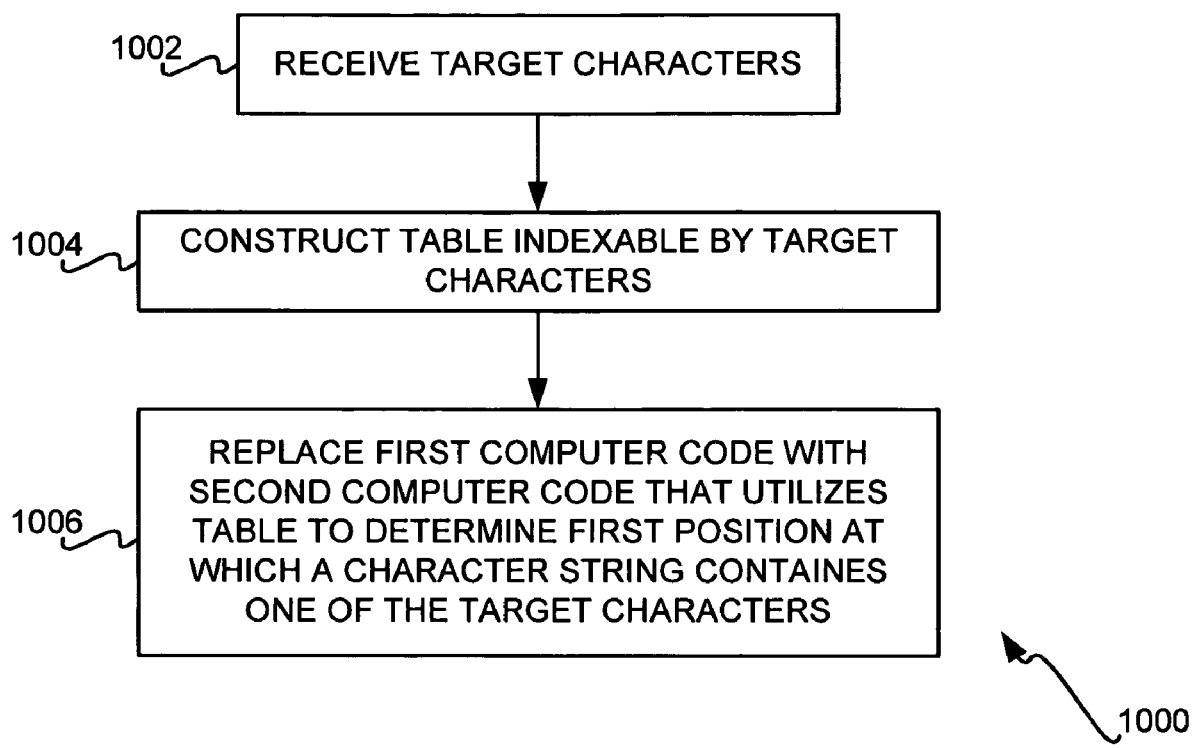
FIG. 10 is a flowchart of a method for generating computer code that employs a processor permutation instruction to determine the first position within a string of characters that contains a target character, or delimiter, according to an embodiment of the invention.

FIG. 10 shows a method 1000 for generating computer code to utilize a processor permutation instruction to locate the first position within a character string that includes a target character, according to an embodiment of the invention. The method 1000 may be implemented by a computer program stored on a computer-readable medium, such as a recordable data storage medium, or a modulated carrier signal. The method 1000 may be used to generate the computer code 400 of FIG. 4 or the computer code 600 of FIG. 6, for instance.

The method 1000 begins by receiving a number of target characters (1102). The target characters are those against which a character string having a number of characters at a corresponding number of positions is to be compared to determine the first position within the character string at which one of the target characters occurs. The method 1000 then constructs a table indexable by the target characters (1004). Examples of the table include those depicted in FIGS. 5 and 8, for instance. Thus, the table has a first value for each character that is one of the target characters, and a second value for each character that is not one of the target characters. Furthermore, the table has a total number of bits less than the total number of bits of the characters themselves. For instance, where each character has eight bits, and there are 256 characters, the table may have just 256 bits, whereas the characters in total have eight times 256, or 2048, bits. The table may be a number of arrays in one embodiment of the invention.

FIG. 11 shows computer code 1100 that can be employed to generate the table in the part 1004 of the method 1000 of FIG. 10, according to an embodiment of the invention. In general, the computer code 1100 examines if statements within loops in first computer code that is to be optimized that may fall in one of four categories. First, such computer code in which there is comparison of a value within a lookup target array and a constant. Second, computer code in which there is a comparison of a value obtained through some processing based on a value within the lookup target array and a constant. Third, computer code in which there is comparison of an induction variable of the loop—i.e., an index of the lookup target array—and an invariable value within the loop. And, fourth, other types of computer code.

When there is an if statement belonging to the fourth category, no optimization is performed, and therefore no table is generated. Otherwise, a set of values to be extracted from the lookup target array is prepared within each block in the loop. A value within the loop target array to leave the loop is found, such as by using a forward data flow analysis where the union set is determined at a confluence. An if statement belonging to the first category takes the product set of a set, where the path-taken or the path-not-taken value is extracted, and a set of the input of a block including the if statement is propagated. An if statement belonging to the second category is judged as to whether or not a set of values within the lookup target array meets the condition of the if statement is specifiable. If not, then the loop is not optimized, and no table is constructed, and otherwise, it can be replaced with a loop of the first category. That is, the product set of a set where the path-taken or the path-not-taken value is extracted, and a set of the input of a block including the if statement is propagated.

An if statement belongs to the third category propagates the empty set to an edge outside of the loop, and otherwise a set of the path-taken or the path-not-taken value is extracted. A set of values extracted for the array and the union set of the set of values extracted for the array are determined at the location of a loading instruction from the arrays targeted for if statements, and propagated forward. Therefore, it is possible to determine a set of values that can be extracted from the lookup target array, to escape the loop.

Referring back to FIG. 10, presuming that a table was constructed in the part 1004, the method 1000 concludes by replacing first computer code with second computer code to determine the first position at which a character string contains one of the target characters (1006). The first computer code does not utilize a processor permutation instruction to achieve this determination, whereas the second computer code does. The second computer code also utilizes the table that has been constructed. For instance, in one embodiment, the part 1006 is performed by replacing the computer code 200 of FIG. 2 with the computer code 400 of FIG. 4. The replacement may be performed by simply scanning the first computer code for the computer code 200, and replacing it with second computer code including the computer code 400.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    defining a 256-bit bitmap, each bit of the bitmap representing an eight-bit character occurrable within a character string and having a value indicating whether the character is a target character, the character string having a plurality of eight-bit characters at a corresponding plurality of positions;
    determining a first position within the character string at which one of the target characters occurs using the 256-bit bitmap and a processor permutation instruction; and,
    outputting the first position within the character string at which one of the target characters occurs, as has been determined.

2. The method of claim 1, further comprising storing the 256-bit bitmap within two sixteen-byte registers.

3. The method of claim 1, wherein the processor permutation instruction has a first sixteen-byte input, a second sixteen-byte input, a third sixteen-byte input, and a sixteen-byte output, the first and the second sixteen-byte inputs concatenated to yield an array of 32 one-byte values, each byte of the sixteen-byte output storing one of the 32 one-byte values of the array based on a value of a corresponding byte of the third sixteen-byte input.

4. The method of claim 1, wherein the processor permutation instructions is a single instruction stream multiple data stream (SIMD) instruction.

5. The method of claim 1, wherein determining the first position within the character string at which one of the target characters occurs comprises:
    shifting each character of the character string by a number of bits;
    inputting the 256-bit bitmap and the character string as the characters thereof have been shifted into the processor permutation instruction to yield a permutation result string having a plurality of eight-bit characters;
    shifting each character of the permutation result string by a number of bits complementary to the number of bits by which each character of the character string was shifted and in an opposite direction to that in which each character of the character string was shifted; and,
    determining whether any character of the permutation result string has a predetermined bit set, as denoting that the character string includes at least one character that is a target character.

6. The method of claim 5, wherein determining the first position within the character string at which one of the target characters occurs further comprises, in response to determining that any character of the permutation result string has the predetermined bit set, locating a first character within the permutation string that has the permutation bit set as corresponding to the first position within the character string at which one of the target characters occurs.

7. The method of claim 5, wherein each character of the character string is shifted right by three bits, and each character of the permutation result string is shifted left.

8. The method of claim 1, wherein the character string is a section of eXtensible Markup Language (XML) code, and each target character is an XML delimiter.

9. A method comprising:
    defining a low 256-bit bitmap and a high 256-bit bitmap representing 256 sixteen-bit characters occurrable within a character string and indicating whether the characters are target characters, the character string having a plurality of sixteen-bit characters at a corresponding plurality of positions;

determining a first position within the character string at which one of the target characters occurs using the low and the high 256-bit bitmaps and a processor permutation instruction; and, outputting the first position within the character string at which one of the target characters occurs, as has been determined.

10. The method of claim 9, wherein each i-th bit of the low 256-bit bitmap has a first value where any sixteen-bit target character has a lower eight bits equal to i and otherwise has a second value, and each i-th bit of the high 256-bit bitmap has the first value where any sixteen-bit target character has an upper eight bits equal to i and otherwise has the second value.

11. The method of claim 9, wherein the processor permutation instruction has a first sixteen-byte input, a second sixteen-byte input, a third sixteen-byte input, and a sixteen-byte output, the first and the second sixteen-byte inputs concatenated to yield an array of 32 one-byte values, each byte of the sixteen-byte output storing one of the 32 one-byte values of the array based on a value of a corresponding byte of the third sixteen-byte input.

12. The method of claim 9, wherein determining the first position within the character string at which one of the target characters occurs comprises:

inputting two sixteen-byte values representing the character string and a sixteen-byte value {0x00, 0x02, 0x04, ..., 0x1C, 0x1E} into the processor permutation instruction to yield a first high permutation result string; and, inputting the two sixteen-byte values representing the character string and a sixteen-byte value {0x01, 0x03, 0x05, ..., 0x1D, 0x1F} into the processor permutation instruction to yield a first low permutation result string.

13. The method of claim 12, wherein determining the first position within the character string at which one of the target characters occurs further comprises:

inputting the high 256-bit bitmap and a bit-shifted version of the first high permutation result string into the processor permutation instruction to yield a second high permutation result string;

inputting the low 256-bit bitmap and a bit-shifted version of the first low permutation result string into the processor permutation instruction to yield a second low permutation result string;

bit-shifting the second high permutation result string; and, bit-shifting the second low permutation result string.

14. The method of claim 13, wherein determining the first position within the character string at which one of the target characters occurs further comprises:

logically AND'ing the second high permutation result string and the second low permutation result string to yield a third permutation result string; and, determining whether any character of the third permutation result string has a predetermined bit set, as potentially denoting that the character string includes at least one character that is a target character.

15. The method of claim 14, wherein determining the first position within the character string at which one of the target characters occurs further comprises, in response to determining that any character of the third permutation result string has the predetermined bit set, locating a first character within the third permutation result string that has the permutation bit set as corresponding to the first position within the character string at which one of the target characters occurs.

16. The method of claim 9, wherein the character string is a section of eXtensible Markup Language (XML) code, and each target character is an XML delimiter.

17. A method comprising:

receiving a plurality of target characters, against which a character string having a plurality of characters at a corresponding plurality of positions is comparable to determine a first position within the character string at which one of the target characters occurs;

constructing a table, the table indexable by a plurality of characters, where the table has a first value for each character that is one of the target characters and has a second value for each character other than one of the target characters, the table having a total number of bits less than a total number of bits of the plurality of characters; and, replacing first computer code effecting comparison of the character string against the plurality of target characters to determine the first position within the character string at which one of the target characters occurs with second computer code effecting the comparison using the table constructed and a processor permutation instruction.

18. The method of claim 17, wherein each target character is eight-bits in length, and the table is a 256-bit bitmap.

19. The method of claim 17, wherein each target character is sixteen-bits in length, and the table includes a low 256-bit bitmap and a high 256-bit bitmap, such that each i-th bit of the low 256-bit bitmap has a first value where any sixteen-bit target character has a lower eight bits equal to i and otherwise has a second value, and each i-th bit of the high 256-bit bitmap has the first value where any sixteen-bit target character has an upper eight bits equal to i and otherwise has the second value.

20. The method of claim 17, wherein the table is a plurality of arrays.

* * * * *